United States Patent [19]

Voinescu

[11] Patent Number: 4,473,956
[45] Date of Patent: Oct. 2, 1984

[54] BORE-MEASURING APPARATUS

[75] Inventor: Nicolae Voinescu, Lausanne, Switzerland

[73] Assignee: Tesa S.A., Renens, Switzerland

[21] Appl. No.: 523,747

[22] Filed: Aug. 16, 1983

[30] Foreign Application Priority Data

Sep. 6, 1982 [CH] Switzerland ............ 5279/82

[51] Int. Cl.³ .................................. G01B 7/12
[52] U.S. Cl. ......................... 33/178 E; 33/143 L; 33/149 J
[58] Field of Search ............ 33/178 E, 178 R, 178 F, 33/143 L, 149 J, 148 H, 149 B, 147 K

[56] References Cited

U.S. PATENT DOCUMENTS

| | | | |
|---|---|---|---|
| 1,667,169 | 4/1928 | Ruck et al. | 33/178 R |
| 2,302,355 | 11/1942 | Sumner | 33/178 R |
| 2,563,216 | 8/1951 | Dale | 33/178 E |
| 2,732,670 | 1/1956 | Foster | 33/178 E |
| 3,802,087 | 4/1974 | Raiteri | 33/178 E |
| 3,962,792 | 6/1976 | Stepánek et al. | 33/178 E |
| 4,172,325 | 10/1979 | Lendi et al. | 33/143 L |
| 4,288,924 | 9/1981 | Mizuno et al. | 33/178 R |

FOREIGN PATENT DOCUMENTS

| | | | |
|---|---|---|---|
| 50-34850 | 4/1975 | Japan | 33/178 E |
| 584088 | 1/1937 | Switzerland | 33/178 R |

Primary Examiner—Willis Little
Attorney, Agent, or Firm—Anthony J. Casella; Gerald E. Hespos

[57] ABSTRACT

The apparatus comprises a body (1) provided with three point-contact feelers (12, 13) which open under the action of a spring (19) and close under the action of a lever (20) via a rod (14) and a spacer stop (15). A displacement pick-up (22) and an electronic circuit (25) convert the displacement of the feelers into a measurement signal which is representative of the diameter of the circle which they define. The electronic circuit comprises a minimum memory (31) to memorize the minimum value of the measurement signal, a member (39) for displaying this value (39) and a measurement-initialization switch (32). After the feelers, folded together, have been introduced into the bore, the lever is released, the switch is actuated, and the apparatus is moved in all directions by the operator in order to cause the plane of the feelers to pass in a diametral plane of the bore, this passage generating the minimum value displayed which is representative of the actual diameter of the bore.

3 Claims, 3 Drawing Figures

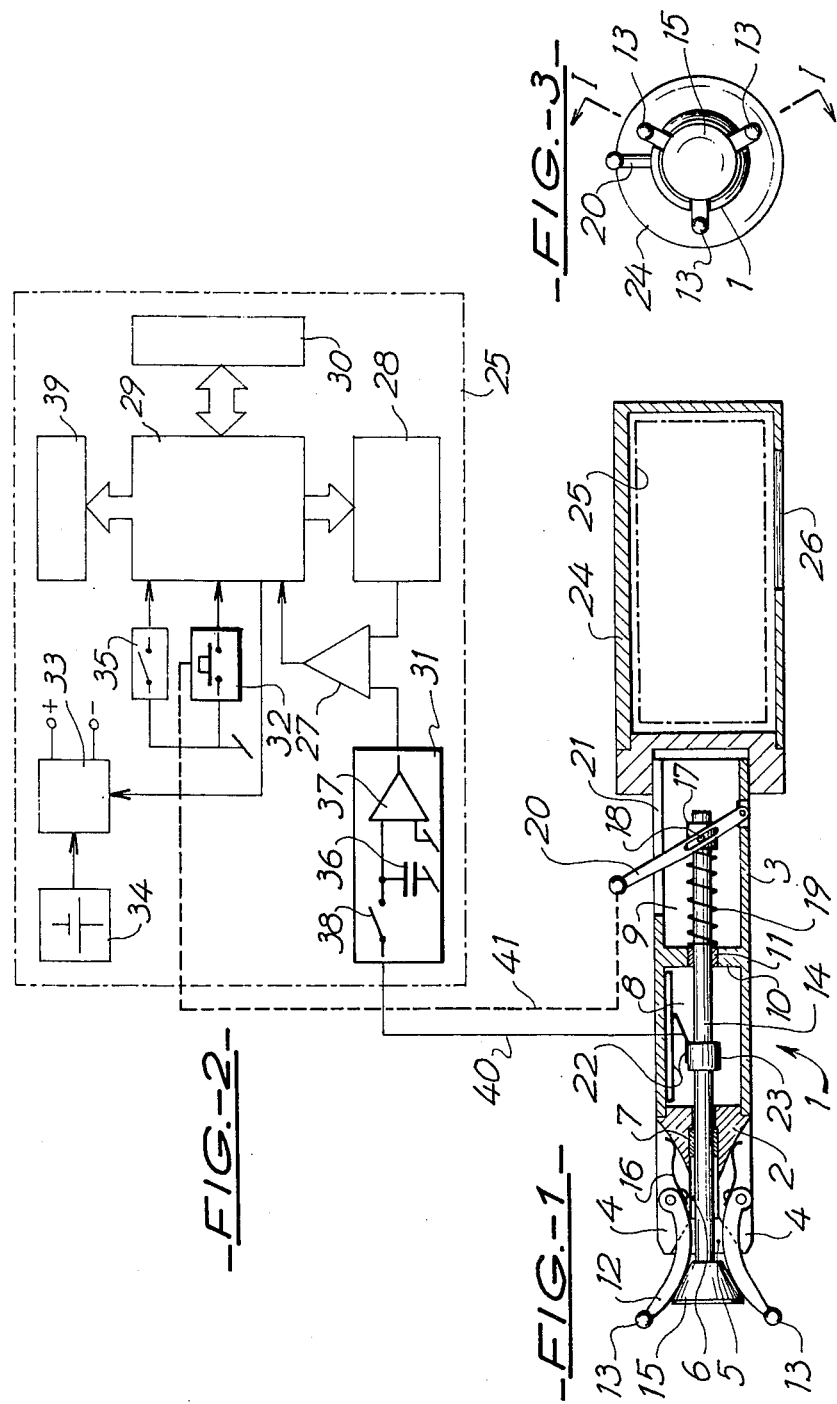

BORE-MEASURING APPARATUS

The invention relates to a bore-measuring apparatus intended for the direct measurement, or else verification of tolerances in machine manufacturing shops.

Like certain known apparatus intended for one or the other of these purposes, this bore-measuring apparatus comprises a tubular body having three end radial slits spaced on its periphery, three measurement fingers in the form of point-contact feeler levers which are intended to feel the wall of a bore and are mounted for radial pivoting in the three slits, a rod mounted for movement by translation within an axial hole in the body, a central spacer stop fastened on the end of the rod between the three measurement fingers and against which said fingers are held pressed by an elastic member, a spring confined between the body and the assembly consisting of the rod and the spacer stop in order to move the three measurement fingers apart, a manual control member acting in the direction opposite that of said spring, a displacement pick-up to convert the displacement of the rod into an electric signal representative of said displacement, and an electronic processing circuit comprising the elements adapted to convert said displacement signal into a measurement signal which is representative of the diameter of the circle defined by the three feelers.

The known apparatus of this type, such as, for instance, the centering and measuring head for the measuring machine described in Swiss Pat. No. 584,088 require that the plane defined by the three point-contact feelers be maintained in a position perpendicular to the axis of revolution of the bore to be measured in order that the measurement carried out be actually representative of its diameter. For this purpose, this known apparatus has a jaw cone intended to be fastened in the chuck of a centering machine which makes it possible to obtain this orientation with respect to the bore. Although practical for a centering operation, this device is less practical for measurement in view of its slowness, since it requires the fastening of the part having the bore to be measured on the machine and the relative displacement thereof with respect to the measurement apparatus in order to cause the axis of the circle defined by the feelers to coincide with the axis of the bore. Furthermore, this centering operation leaves a certain amount of uncertainty as to the perfect coincidence of these two axes due to the elasticity of the parts in contact and, in particular, the mass of the parts of the machine to which the instrument and the part having a bore to be measured are fastened, which uncertainty cannot be tolerated in the case of precise measurements.

In another bore-measuring apparatus of similar type, described in published Japanese Patent Application No. 50-34850 and used in the same manner as the preceding one, that is to say, with the aid of a centering machine, a stress gauge is associated with each of the three point-contact measurement feelers. In this way, it is possible to maintain the above-mentioned coincidence of the axes by equalizing the stresses to which the three feelers are subjected. However, this improvement, while assuring reliability of the measurement effected, complicates the operating procedure, further increases the slowness thereof and is expensive.

There is also known a micrometer gauge intended for the measurement of bores which also comprises three point-contact measurement feeler fingers but which is intended for purely manual use. In this gauge, which is described in U.S. Pat. No. 2,302,355, the transducer is mechanical, of the type comprising micrometer screw which actuates the feelers. Its advantage over the two apparatus described above resides obviously in its structural simplicity, since the measurement is carried out without the use of a centering machine. However, on the other hand, this simplicity is obtained at the cost of delicate and unreliable manipulation due to the total absence of a centering means which makes it possible to align the axis of the apparatus with the axis of the bore to be measured.

For this reason, in view of the complex nature and slowness of the means employed for the use of the first two apparatus mentioned above and the delicacy of manipulation and lack of reliability of the third apparatus, bore-measuring apparatus have been created in which the measurement feelers themselves serve as centering and alignment means. These feelers, of which there are also three, comprise for this purpose a contact surface with linear generatrices defining a cylinder instead of a circle, and their radial displacement is obtained by translation instead of pivoting. In this way, when the three feelers have been brought into contact with the wall of a bore to be measured, the apparatus is automatically centered and aligned in the latter. However, these advantages in the use of the apparatus and, in particular, in its reliability can be obtained only at the price of very precise manufacture and a high degree of finish, in particular with respect to the geometry of the measurement feelers and fingers as well as of the movement conversion parts which enter into their kinetics.

The object of the present invention is to impart good reliability to point-contact measuring feelers without, on the other hand, requiring for their use the additional use of a centering machine or delicate manipulation and without requiring the degree of finish and precision in manufacture of the apparatus with linear-contact measurement feelers.

For this purpose, the bore-measuring apparatus of the invention, which is of the type described at the beginning of this disclosure, is characterized by the fact that the electronic processing circuit which is adapted to produce a measurement signal representative of the circle defined by the three feelers comprises a minimum memory adapted to memorize the minimum value of the measurement signal, a member for the display of this minimum value, and a measurement-initialization switch. In this way, the measurement of the bore is effected manually by first of all bringing the measurement fingers together by exerting pressure on the manual control member, introducing the fingers into the bore and then allowing them to move apart under the action of the spring in order to feel the wall of the bore by releasing the manual-control member, the measurement-initialization switch being then actuated after these positioning operations, and then moving the apparatus in all directions so as to cause the plane of the feelers to move in a diametral plane of the said bore, this movement generating the aforesaid minimum value displayed.

These characteristics are well suited for the desired purpose, combining reliability with structural and operating simplicity. The reliability resides in the fact that only the minimum value of the diameter of the circle defined by the three feelers within the bore is displayed, this value corresponding to the cross section of the cylinder formed by the wall of the bore and therefore to its actual diameter. The simplicity of operation goes without saying, the feeling of the wall of the bore by the successive moving apart and together of the measurement fingers while the operator moves the apparatus in all directions taking place solely by the elastic response of the spring. As to the structural simplicity, it is obtained both by the absence of additional mechanical centering and alignment members and by the fact that the apparatus does not require great precision of execution or a high degree of finish for all of the parts thereof which form part of the kinematics of the point-contact measurement feeler fingers, as necessary in linear-contact feeler apparatus.

The accompanying drawing shows one embodiment of the object of the invention, given by way of example.

FIG. 1 is a diagrammatic view in longitudinal section along the section line I—I of FIG. 3, limited to a showing of its mechanical parts.

FIG. 2 is a block diagram of its electronic circuit.

FIG. 3 is a front view thereof.

The bore-measuring apparatus, whose mechanical parts are shown in FIGS. 1 and 3 comprises a tubular body 1 comprising two rigidly connected parts 2 and 3.

The front part 2 of this body has three radial slits 4 spaced at an angle of 120 degrees from each other on its periphery, a frustoconical inlet 5 which flares outward towards the outside, and an axial hole 6 containing a first bearing 7. The rear part 3 of this body has two chambers 8 and 9 separated by a wall 10 provided with a second bearing 11. The frustoconical inlet 5, the hole 6, and the bearings 7 and 11 are coaxial.

Three measurement fingers 12 having the shape of arched levers with spherical contact feelers 13 are mounted for radial pivoting in the three slits 4 on a pivot borne by each one of them. The inner face of these three fingers is in the shape of a circular arc which is convex towards the axis of the axial hole 6 of the body.

Within this axial hole 6, there is mounted for translation a cylindrical rod 14 which bears, fastened at its end between the three measurement fingers 12, a central spacer stop 15 in the shape of a conical frustum which is open towards the outside, the wall of this conical frustum being determined in angle and extent so as to be tangent with the inner face, having the shape of a circular arc, of the fingers 12 during the entire opening stroke of said fingers.

Each of the three measuring fingers 12 is held pressed against the central spacer stop 15 by a respective leaf spring 16 fastened on the finger and resting against the rear wall of the slit in which it is articulated.

The end of the rod 14 opposite the spacer stop 15 has a sleeve 17 bearing a radial drive pin 18.

A coil compression spring 19 is mounted on the rod 14 and confined between the wall 10 of the rear part 2 of the body and the sleeve 17, so that its action has the effect of moving the measurement fingers 12 apart as a result of the effect of the frustoconical spacer stop 15.

On the radial drive pin 18 of the sleeve 17 borne by the rod 14 there is mounted, engaged with it, a manual control member whose action is opposite that of the spring 19 and consists of a lever 20 whose one end is pivoted to the wall of the rear part 3 of the body 1 and whose other end, its operating end, extends to the outside of the body through a radial slit 21.

In this way, by actuating said lever in the direction opposite to that of the action of the spring 12, the measurement fingers 19 are brought together. On the other hand, by the relaxing of this lever, these finers are moved apart.

In the first chamber 8 in the rear part 3 of the body 1 there is mounted a displacement pick-up 22, in this case of resistive type, the wiper of which is mounted on a sleeve 23 fastened to the rod 14 and whose analog electric output signal is representative of the displacement of this rod within the body 1.

The rear part 3 of the body 1 is here mounted with force-fit in a housing 24 containing an electronic feed and processing circuit 25 comprising the elements adapted to convert the analog displacement signal coming from the pick-up 22 into a digital measuring signal representative of the diameter of the circle defined by the three point-contact feelers 12, this signal being made visible through a window 26 in the housing 24 facing the terminal display element of said circuit.

The electronic circuit 25, a block diagram of which is shown in FIG. 2, comprises, on the one hand, the elements adapted for the processing of the signal provided by the displacement pick-up, said elements being formed of a comparator 27, a digital-analog converter 28, a processor 29 and a correction memory 30, and, on the other hand, two elements which characterize it, which are formed by a minimum memory 21 and a measurement-initialization switch 32. This circuit is excited by a digital signal coming from a voltage transformer 33, fed by batteries 34, under the control of an on-off switch 35.

The displacement pick-up 22 is connected to one input of the comparator 27 via the minimum memory 31, which is composed, in this case, of a capacitance 36 and a comparator 37 controlled by a switch 38, while the second input of this comparator 27 is connected to the digital-analog converter 28 and the output of said comparator 27 is connected to the processor 29. This processor, in its turn, is connected to the digital-analog converter 28, to the correction memory 30, and to a terminal element 39 which displays the digital measurement value.

This minimum memory 31 is connected to the displacement pick-up 22 by an electric cable 40, and the measurement-initialization switch 32 is controlled by the lever 20 to which it is connected for this purpose by a mechanical connection 41 adapted to close the circuit when this lever is released and pushed back by the spring 19.

The correction memory 30, which is, for instance, of the EPROM type, has the function of correcting errors in linearity of the mechanical transmission, such as those generated here by the transformation of the conical frustum 15—fingers 12 movement, as well as errors in manufacture and in the measurement system.

In order to avoid having the measurement-initialization switching take place between the instant of release of the lever 20 and the instant of contact of the feelers 13 with the wall of the bore to be measured, this circuit has a time-delay element (not shown) which is this case is repeatable programming routine based on the use of a processor but which may be formed of any equivalent such as, for instance, a holding loop associated with the said switch.

In this circuit, the comparator 27 compares the minimum value coming from the minimum memory 31 with the output value of the digital-analog converter 28. The processor 29 proceeds by successive approximations until obtaining identity between these two signals. The digital output signal of the processor 29 thus corresponds to the corrected minimum value delivered by the minimum memory 3, and this value, displayed by the display element 39, is that of the diameter of the bore measured in accordance with the operating procedure already described, for the reasons already mentioned.

Of course, this electronic processing circuit as well as the mechanical parts which constitute the apparatus may be varied without going beyond the scope of the invention.

Thus, with reference to the electronic processing circuit, the latter will be adapted to the type of displacement pick-up used, which may be inductive, capacitive or incremental instead of resistive, and to the type of output measurement signal desired, which may be analog instead of digital as in the case of the use of the apparatus for comparative rather than absolute measurement with remote display on a dial, provided that in each case this circuit has a minimum detector and a measurement-initialization switch, as taught by the invention.

In the embodiment shown, the use of the electronic circuit is advantageous from an economical standpoint. An analog-digital processing system would, however, do the same work without requiring a comparator, but it would be more expensive.

This circuit as shown here is contained in a housing 24 associated with the body 1. This arrangement has the advantage that it can permit, if desired, the mounting on one and the same housing of a different measurement heads of different capacitances. In such case, each measurement head will bear, incorporated in it, its own correction memory, for instance, in the rear chamber 9 of the body 1. However, the electronic circuit may just as well be contained in a housing which is located a distance away and is connected to the body 1 by a connecting cable.

With respect to the mechanical parts, it should be noted that the linearity of the mechanical transmission between the rod 14 and the feelers 13 could be obtained by replacing the conical frustum 15 by a suitable cam, but this at the cost of a mechanical precision which cannot be desired in view of the simplicity of the correction of the defects in linearity by a correction memory 30.

The fingers 12 which bear the feelers 13 may be developed in the form of bent levers which are articulated at their bends, and their bent parts opposite the feelers can be held pressed against the front face of a simple plate fastened to the end of the rod 14. However, the system shown as example has the advantage of bringing the point of contact of the fingers 12 on the conical frustum 15 closer to the feelers 13, which limits the effects of the flexibility of these fingers on the reliability of the measurement.

This particular arrangement, given by way of example, also has the advantage of not requiring a high degree of mechanical precision in its manufacture since, due to the absence of rotation of the conical frustum 15 during the displacement of the measurement fingers and due to the fact that the reliability of the measurement is assured by the simple passage of the plane of the feelers in a diametral plane of the bore to be measured, it is unimportant whether this conical frustum is perfectly centered with respect to the position of the measurement fingers nor whether its axis is perfectly perpendicular to the plane of the feelers.

Finally, the actuating of the measurement-initialization switch by the lever 20 is a practical advantage which simplifies the operation of making the measurement, but this actuation can be obtained manually by means of a push-buttom device, in which case the time-delay element of the switch is not needed, the operator performing this function by actuating the switch only after having completely released the lever 20.

What is claimed is:

1. A bore-measuring apparatus comprising a tubular body (1) having three end radial slits (4) spaced on its periphery, three measurement fingers (12) in the form of point-contact feeler levers (13) intended to feel the wall of a bore, and, mounted for radial pivoting in the three slits, a rod (14) mounted for movement by translation with an axial hole (6) in said body, a central spacer stop (15) fastened on the end of rod between the three measurement fingers and against which said fingers are held pressed by an elastic member (16), a spring (19) confined between the body and the assembly consisting of the rod and the spacer stop (14, 15) in order to move the three measurement fingers apart, a manual control member (20) acting in the direction opposite that of said spring, a displacement pick-up (22) for converting the displacement of the rod into an electric signal representative of said displacement, and an electronic processing circuit (25) comprising the elements adapted to transform said displacement signal into a measurement signal representative of the diameter of the circle defined by the three feelers, characterized by the fact that the electronic processing circuit comprises a minimum memory (31) adapted to memorize the minimum value of the measurement signal, a member (39) for displaying said minimum value and a measurement-initialization switch (32), so that the measurement of the bore is effected manually by first of all moving back the measurement fingers by pressure exerted on the manual control member, introducing said fingers into the bore, allowing them to move apart under the action of the spring in order to feel said wall by releasing the manual control member, the measurement-initialization switch being then actuated after these positioning operations, and then moving the apparatus in all directions so as to cause the plane of the feelers to pass in a diametral plane of the said bore, such passing generating the above-mentioned minimum value displayed.

2. An apparatus according to claim 1, characterized by the fact that the three measurement fingers (12) are curved, their inner faces consisting of circular arcs which are convex toward the axis of the axial hole (6), and by the fact that the spacer stop (15) is in the shape of a conical frustum open towards the outside of the body (1), its wall being tangent to said inner faces of the measurement fingers.

3. An apparatus according to claim 1, characterized by the fact that the measurement-initialization switch (32) is actuated by the manual control member (20), to which it is connected for this purpose by a mechanical connection (41), and by the fact that the electronic processing circuit comprises a time-delay element which is associated with said switch in order to delay the switching.

* * * * *